Aug. 15, 1939  S. T. WILLIAMS  2,169,378

METHOD OF FORMING RUBBER HEADED VALVE STEMS

Filed Sept. 10, 1935

INVENTOR
Selden T. Williams,
BY
Fraser, Myers & Mauley
ATTORNEYS.

Patented Aug. 15, 1939

2,169,378

UNITED STATES PATENT OFFICE 2,169,378

METHOD OF FORMING RUBBER-HEADED VALVE STEMS

Selden T. Williams, Bellerose, N. Y., assignor to Scovill Manufacturing Company, Waterbury, Conn., a corporation of Connecticut Application September 10, 1935, Serial No. 39,882

2 Claims. (Cl. 154—14)

My present invention relates to the method of forming rubber-headed valve stems for inflatable bodies, and constitutes a continuation in part of my application, Serial No. 704,420, filed December 29, 1933.

Primarily my invention is directed to the method of making valve stems for pneumatic tire tubes having the following advantageous characteristics: (1) it may be applied to standard tube rim practice without the necessity of tire mold changes; (2) it may eliminate the requirement for a fabric patch or may eliminate a patch requirement altogether if such patch be incorporated with the valve stem; (3) it may be used with the conventional clamping nut or bridge or ring washer, thereby providing an additional safety factor; (4) it permits the use of dust caps or inflating caps for improvement of appearance of the valve stem and facilitates the mounting and inflation of the tire; (5) it eliminates base leaks and permits the "drawing back" of the valve stem into a casing upon sudden deflation of the inner tube; (6) it provides a strong shanked valve with a high inflation rate; (7) it provides a low cost valve stem and patch construction by means of which the assembly of the valve stem and an inflatable body is facilitated and improved; and (8) it permits curing of the tire tube with the valve insides or valve core in place within the valve stem.

According to my invention the valve stem is preferably formed with an enlargement or flange spaced from the tube-engaging end of the stem whereby there is provided an extension or portion adapted to extend into the inflatable body, said stem being preferably grooved or incut adjacent the opposite sides of said flange to provide a more secure and efficient anchorage or union for the valve stem patch which may take the place of the conventional inner tube patch at the valve stem opening in the tube. The valve stem construction is such that creeping or flashing of the rubber patch beyond predetermined portions on the valve stem adjacent one end thereof is prevented during the curing of the patch onto the stem, by providing bearing faces on the stem for engagement with complemental bearing faces on the vulcanizing mold.

The invention also embodies other features of novelty which will be understood from the detailed description which follows, when considered in conjunction with the accompanying drawing, wherein Figure 1 is a fractional elevation of a valve stem embodying my invention with a valve stem patch secured thereto, said patch being shown in section.

Figure 5:
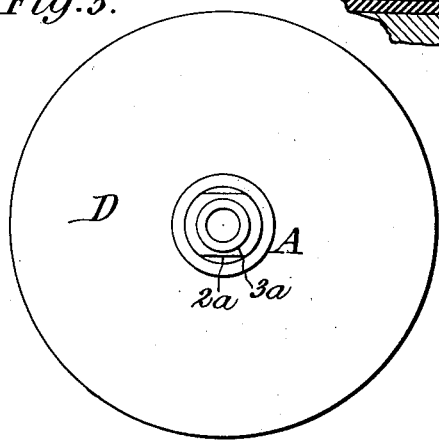
Fig. 5 is a top plan view of the valve stem and patch assembly shown in Fig. 4.
Figure 1:
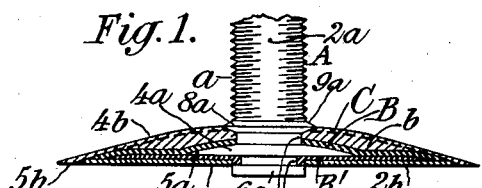

Referring first to Figs. 1 and 5 of the drawing, let A indicate the valve stem as a whole, which is preferably formed of brass or other suitable material, said stem being provided with the conventional screw threads $a$, flats $2a$ and a reduced threaded nipple $3a$. The valve stem at the tube-engaging end thereof is formed with an annular enlargement or disk-like portion $4a$ which preferably terminates at its outer periphery in a feathered edge $5a$, said portion $4a$ being axially spaced from the end of the stem to provide an axially-extending portion $6a$. Preferably the stem adjacent the opposite faces of the portion $4a$ is formed with annular grooves or undercut portions $7a$, the purpose for which will presently appear. Between the enlargement $4a$ and the stem shank proper above the groove $7a$ is a second enlargement $8a$ of smaller diameter than the portion $4a$, said enlargement $8a$ having oppositely-directed, outwardly tapered sides or faces $9a$. The valve stem A is suitably axially bored to provide a passage of air therethrough and formed with screw-threads, shoulders and the like (not shown) for accommodating the conventional valve insides or valve core.

The disk-like portion $4a$ of the valve stem is embedded in a substantially circular or oval patch-like mass of rubber which may be suitably moulded and semi-cured about said disk-like portion, but which is preferably formed by applying circular or oval strips of uncured rubber B and B' having central holes therein over the enlargement $8a$ and over the axial extension $6a$, respectively, so that the inner peripheries of said strips will seat within the recesses $7a$, as best shown in Fig. 1, and pressing said strips together beyond the feathered edge $5a$ of the enlargement. Additional strips or quantities of uncured rubber b and 2b may then be positioned over the strips B and B' to form a patch portion having a substantially plane tube-engaging face 3b and a rim-engaging face 4b, which faces preferably meet in a tapered peripheral edge 5b. Preferably the face 4b at its inner periphery will lie flush with the upper face 9a of the secondary enlargement 8a and the lower face 3b will leave the lower end of the axial extension 6a uncoated with rubber, whereby said extension may serve as a guide or centering means for properly positioning the valve stem and patch upon an inner tube in the assembling of said parts preparatory to vulcanizing them together. If desired, the patch may be reinforced by one or more fabric strips C.

Figure 2:
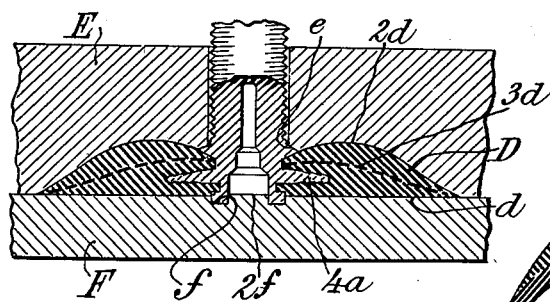
Fig. 2 is a section, partly in elevation, showing the manner of curing the patch onto a valve stem.
Figure 4:
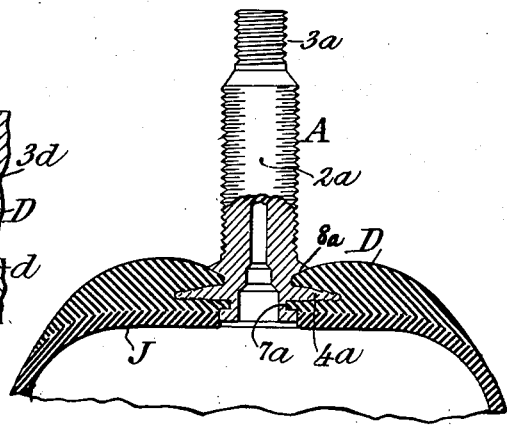
Fig. 4 is a section of the valve stem patch and tube assembly of Fig. 3 taken at right angles thereto, the valve stem being shown partially in elevation.
Figure 3:
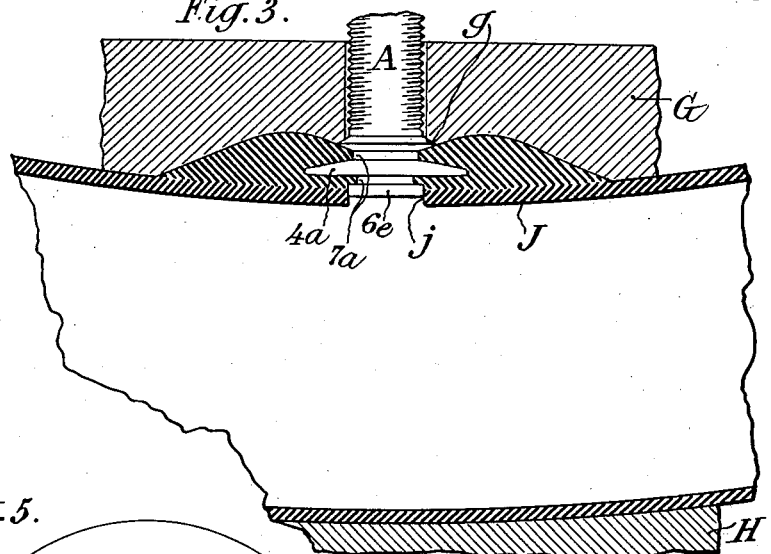
Fig. 3 is a section showing the manner in which a valve stem and patch assembly, as shown in Fig. 2, may be vulcanized to an inner tube, the valve stem being shown in elevation.

In Figs. 2, 3 and 4 I have shown a form of valve stem patch D which is thickest intermediate its inner and outer peripheries and preferably formed with a suitable, substantially plane inner tube engaging face d and an outwardly curved or arched rim-engaging face 2d. The patch D is so designed to provide more rubber over the metal enlargement 4a and also to assist in withdrawing the valve into the tire casing through the valve stem opening in a wheel rim when the tire is suddenly deflated. This withdrawing action is promoted by the inherent expansibility of said thickened portion which is normally subjected to compression when the inner tube mounted upon a rim is inflated, and which, when the internal pressure within the tube is relieved, seeks to assume its normal characteristics, and in doing so it will tend to move the tube and the stem carried thereby radially inwardly of the rim. This thickened patch D may be formed of a plurality of rubber strips such as disclosed in Fig. 1 and may likewise be provided with a fabric reinforcing strip 3d.

The rubber patch composed of the various parts B, B', b and 2b, as shown in Fig. 1, or the mass of rubber D shown in Fig. 2, is preferably semi-cured in situ upon the valve stem in a mold, such, for example, as shown in Fig. 2, and consisting of a top mold section E and a bottom mold section F, the mold section E having a tapered or conical face e adapted to engage the conical face 9a on the enlargement 8a, and the mold section F having a bearing face f adapted to engage against the bottom face of the projection 6a on the valve stem. It is intended that the distance between the bearing faces e and f on the mold sections when in assembled relation shall correspond to the distance between the bearing faces 9a and the bottom face of the projection 6a on the valve stem so as to insure against any undesired creeping or oozing of the rubber over said faces on said projections 8a and 6a. To prevent entry of any of the rubber into the bore of the valve stem A, the mold section F may be provided with a projection 2f adapted to engage and snugly fit within the bore of the valve stem at the bottom thereof. The strips or laminations of the rubber forming the patch or the mass of rubber forming said patch which directly engage the surfaces of the enlargement 4a and the bottoms of the grooves 7a are preferably of a rubber composition which will provide a strong adhesion or union with said metal parts, whereas the laminations or rubber stock outwardly of said metal-contacting areas may be of a composition similar to that of which inner tubes are made.

In Fig. 3 I have shown the manner in which the valve stem and patch assembly of Fig. 2 is to be positioned within a mold for attachment to the outer wall of an inner tube. The valve stem and patch assembly is enclosed within a suitable mold preferably of the watch case type, consisting of sections G and H, with the projection 6e of the valve stem engaging within the valve stem opening j of an inner tube J. Pressure may be applied through the valve stem to inflate the tube within the mold and vulcanize the tube in situ to the patch. In this connection the mold section G may be formed with a bearing shoulder g adapted for complemental engagement with the bearing surface 9a on the valve stem for insuring proper alignment of the parts.

In providing a valve stem and patch assembly such as disclosed, it will be appreciated that I have provided a construction which possesses the various advantageous characteristics set forth in the opening statement of this specification and one which greatly facilitates the assembly of the valve stem to an inner tube.

From the foregoing detailed description it will be apparent to those skilled in the art that instead of providing the patch from two types of rubber stock, as disclosed in Fig. 1, prior to semi-curing the patch in situ on the valve stem, the stem may be suitably treated to improve the adhesion of the metal of the stem and the rubber of the patch, or a suitable rubber cement may be employed so that the rubber patch consisting of single rubber composition, can be applied to said stem in a single operation. It will also be apparent that the size, shape and the degree to which the patch surrounds the valve stem may be varied to suit any particular type of tire valve stem, and also that the amount of fabric or other reinforcement in the patch may be modified at will. Accordingly, I do not wish to be limited to the details of construction disclosed, since it is apparent that the same may be modified without departing from the spirit of my invention.

What I claim is:

1. The method of forming a metallic valve stem and inflatable body assembly, which comprises providing a patch-like mass of unvulcanized rubber around the extreme foot on a valve stem, leaving the end part of said valve stem at said foot uncoated with rubber and projecting beyond said patch-like mass, semi-curing the patch-like mass onto the valve stem in situ, then applying the valve stem and patch-like mass to the outer wall of a vulcanizable inflatable body having a valve stem opening therein so that the uncoated, valve stem opening engages in the valve stem projecting foot portion engages in the valve stem opening and the patch-like mass overlies and engages the wall surrounding said opening and vulcanizing the assembly as a whole in a suitable mold.

2. The method of forming a valve stem and inflatable body assembly, which comprises providing a valve stem having an enlarged foot portion of rubber, from the underside or inflatable body-engaging face of which extends an axial projection of reduced diameter and applying the enlarged foot portion of the valve stem to the outer wall of a vulcanizable inflatable body having a valve stem opening therein, so that the axial projection on the inflatable body-engaging face of the enlarged foot portion engages in the valve stem opening in said wall and the enlarged portion overlies and engages the wall surrounding said opening, and vulcanizing the assembly as a whole in a suitable mold.

SELDEN T. WILLIAMS.

CERTIFICATE OF CORRECTION.

Patent No. 2,169,378. August 15, 1939.

SELDEN T. WILLIAMS.

It is hereby certified that error appears in the printed specification of the above numbered patent requiring correction as follows: Page 1, second column, line 39, for the word "of" read for; page 2, second column, line 46, claim 1, for "extreme foot on a valve" read foot on a metallic valve; line 47, same claim, before "end" insert extreme; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.